Oct. 29, 1963  M. KERKHOVE  3,108,570
BIRDHOUSES
Filed Feb. 19, 1963
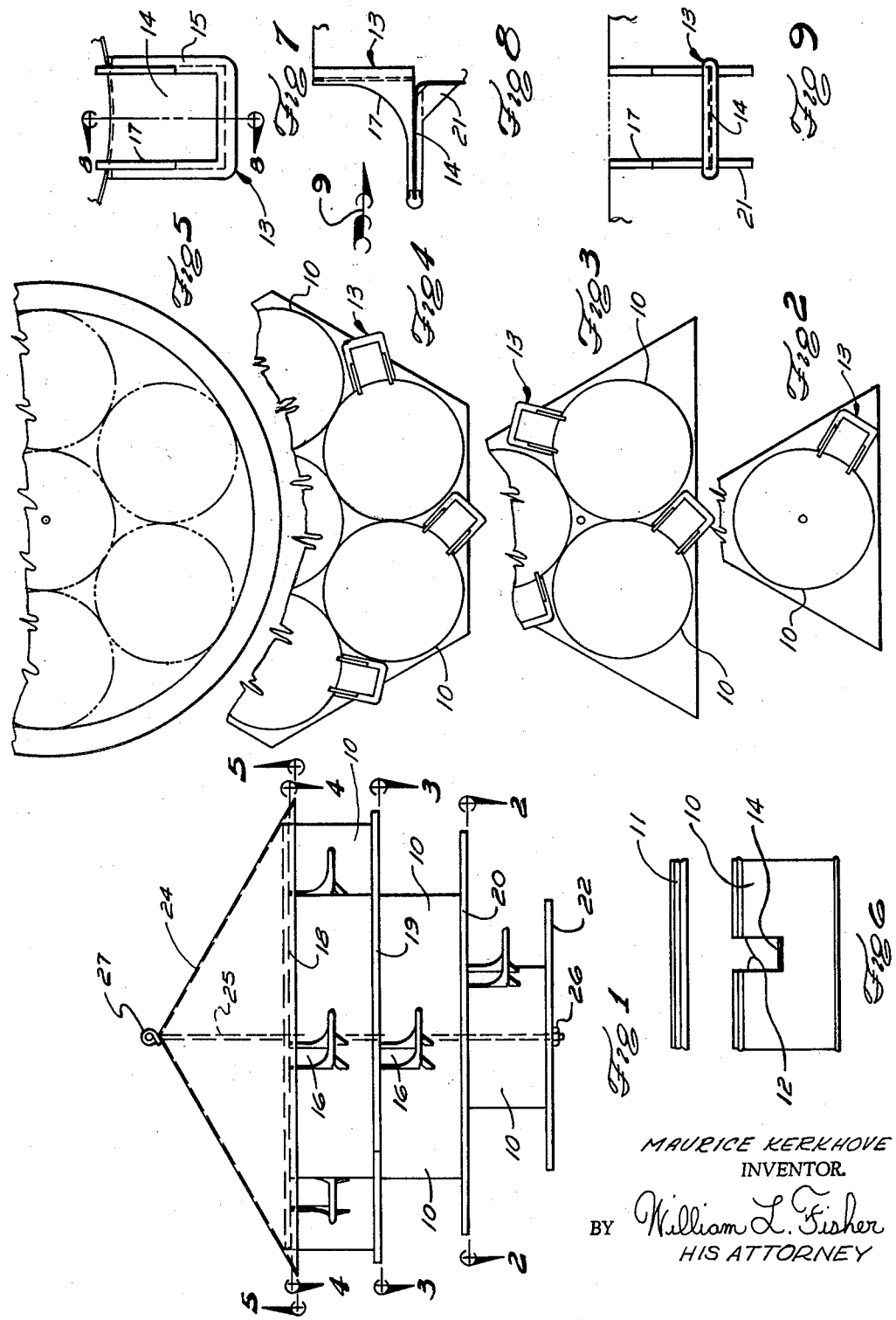
MAURICE KERKHOVE
INVENTOR.
BY William L. Fisher
HIS ATTORNEY

# United States Patent Office 3,108,570
Patented Oct. 29, 1963

3,108,570
BIRDHOUSES
Maurice Kerkhove, Wayne County, Mich.
(4891 Yorkshire, Detroit, Mich.)
Filed Feb. 19, 1963, Ser. No. 259,594
4 Claims. (Cl. 119—23)

This invention relates to improvements in birdhouses and has for its principal object to provide a construction for a colony birdhouse which utilizes conventional coffee cans and which can be used advantageously as an advertising device to promote the sale of coffee.

The foregoing and other objects of the present invention will become apparent during the course of the following description, taken in conjunction with the accompanying drawings, in which:

FIG. 1 is a side elevational view of a birdhouse embodying the invention;

FIGS. 2, 3, 4 and 5 are fragmentary horizontal sectional views of the structure of FIG. 1 taken, respectively, along the lines 2—2; 3—3; 4—4 and 5—5 thereof;

FIG. 6 is a front elevational view of a conventional coffee can illustrating a part of the invention; and FIGS. 7, 8 and 9 are plan, side and front elevational views of the structure of the access opening to each coffee can birdhouse; FIG. 8 being a sectional view of the structure of FIG. 7 along the line 8—8 thereof; and FIG. 9 being an elevational view of the structure of FIG. 8 as viewed in the direction of the arrow 9 thereof.

Referring to the drawings in more detail, 10 indicates a conventional coffee can which may be either the familiar 1 lb. or less familiar 2 lb. size and which had its rim 11 removed as shown in FIG. 6. The edges 12 shown in this figure on the side wall of the can 10 indicate where the housewife has cut into it with ordinary household scissors to structurally modify such side wall to form a separate portion 14 which is bent outwardly of and at right angles to such side wall as best shown in FIGS. 7 and 8.

As shown in FIGS. 1 and 2–5 the birdhouse is of the multi-tier type for a colony of birds and each tier comprises at least one such coffee can 10, modified as described, which is covered with a ceiling board that forms with the bent-away and cut-away portion 14 a bird access opening 16 to the coffee can interior. The ceiling board for each tier, except the uppermost one, serves as the floor board for the tier above it as shown in FIG. 1 in which the ceiling boards are designated 18, 19 and 20 for the tiers from the uppermost to the lowest one. A floor board 22 is provided for the can or cans in the lowest tier and between it and the uppermost ceiling board 18 means are provided for applying a compressive force between them to retain the tiers in a unitary arrangement. In the instance shown the ceiling board 18 fits within the confines closest to the non-apex end of a conical roof 24 and a tie rod 25 extends through all the tiers. The rod 25 is provided with fastener means 26 at one end and an enlarged eye 27 at its opposite end by which the birdhouse may be suspended.

As shown best in FIGS. 7–9 a plastic member 13 is pushed on to the outturned portion 14 which may conveniently serve as a ledge or perch in front of the opening 16 for the birds. The member 13 has horizontal legs 15 which are integrally united so as to conform with the periphery of the ledge 14 and encompass the same to protect the bird against its sharp edges when such member is pushed into place thereon. Vertical legs 17 are provided which upstand each on one of the legs 15 and serve as a guard against the sharp edges 12 on the side wall of each can. A stop 21 in the form of downwardly projecting vertical walls each at one of the legs 15 insures the proper positioning of the ledge 14 with respect to the coffee can side wall and limits the travel of the member 13 when it is inserted into place on the coffee can.

In use of the invention as an advertising device the ceiling and floor boards, roof and tie rod and plastic protector may be supplied to the housewife who would be encouraged to save her empty coffee cans which she can readily modify and combine with the first-mentioned elements into the combination birdhouse described.

It will thus be seen that there has been provided by the present invention improvements in birdhouses in which the advantages hereinabove set forth together with many other thoroughly practical advantages have been successfully achieved. While a preferred embodiment of the invention has been shown and described it is to be understood that modifications, variations and changes may be resorted to without departing from the spirit of the invention as set forth in the appended claims.

What is claimed is:

1. In a birdhouse construction, the combination comprising a conventional coffee can from which the rim has been removed and which has had its side wall cut into from its rimless edge, a portion of such wall separated from the remaining can wall to form a bird access opening therein, a board to cover the can and means to secure the cover board and can together in a unitary bird housing chamber.

2. In a birdhouse construction, the combination comprising a conventional coffee can from which the rim has been removed and which has had its side wall cut into from its rimless edge, a portion of such wall separated from the remaining can wall to form a bird access opening therein, and a plastic member which fits over the periphery of said separated portion and protects the bird against sharp edges of the side wall from said cutting.

3. In a birdhouse construction, the combination comprising a conventional coffee can from which the rim has been removed and which has had its side wall cut into from its rimless edge, a portion of such wall separated from the remaining can wall to form a bird access opening therein, a ceiling board to cover the can and a floor board on which it rests, and means for applying a compressive force between the boards to retain them and the can together in a unitary bird housing chamber.

4. In a multi-tier colony birdhouse, the combination for each tier comprising a conventional coffee can from which the rim has been removed and which has had its side wall cut into from its rimless edge, a portion of such wall separated from the remaining can wall to form a bird access opening therein, a ceiling board to cover the can and a floor board on which it rests, the ceiling board for each tier except the top one serving as the floor board for the tier above, a cover within which the ceiling board for said top tier fits, and means for applying a compressive force between the tiers to retain them in a unitary multi-tier colony birdhouse.

References Cited in the file of this patent
UNITED STATES PATENTS

| | | |
|---|---|---|
| 1,916,878 | Anklam | July 4, 1933 |
| 1,987,347 | Moore | Jan. 8, 1935 |
| 2,944,515 | Mura | July 12, 1960 |
| 3,078,826 | Bear | Feb. 26, 1963 |